(12) United States Patent
Santos et al.

(10) Patent No.: US 8,069,075 B2
(45) Date of Patent: Nov. 29, 2011

(54) METHOD AND SYSTEM FOR EVALUATING PERFORMANCE OF A WEBSITE USING A CUSTOMER SEGMENT AGENT TO INTERACT WITH THE WEBSITE ACCORDING TO A BEHAVIOR MODEL

(75) Inventors: Cipriano Santos, Modesto, CA (US); Evan Kirshenbaum, Mountain View, CA (US); Mathias Salle, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3354 days.

(21) Appl. No.: 10/378,872

(22) Filed: Mar. 5, 2003

(65) Prior Publication Data
US 2004/0176992 A1 Sep. 9, 2004

(51) Int. Cl.
*G06Q 10/00* (2006.01)
(52) U.S. Cl. .................... 705/7.29; 705/7.38
(58) Field of Classification Search .............. 705/7.29, 705/7.38
See application file for complete search history.

(56) References Cited

U.S. PATENT DOCUMENTS

| | | | |
|---|---|---|---|
| 5,537,618 A | 7/1996 | Boulton et al. | |
| 5,734,890 A | 3/1998 | Case et al. | |
| 6,275,811 B1 | 8/2001 | Ginn | |
| 6,289,353 B1 | 9/2001 | Hazlehurst et al. | |
| 6,289,502 B1 | 9/2001 | Garland et al. | |
| 6,314,420 B1 | 11/2001 | Lang et al. | |
| 6,408,293 B1 | 6/2002 | Aggarwal et al. | |
| 6,449,632 B1 | 9/2002 | David et al. | |
| 6,466,686 B2 | 10/2002 | Senior | |
| 6,606,581 B1* | 8/2003 | Nickerson et al. | 702/186 |
| 6,850,988 B1* | 2/2005 | Reed | 709/238 |
| 2002/0087679 A1* | 7/2002 | Pulley et al. | 709/224 |
| 2002/0107719 A1* | 8/2002 | Tsang et al. | 705/10 |
| 2002/0107741 A1 | 8/2002 | Stern et al. | |
| 2002/0123957 A1* | 9/2002 | Notarius et al. | 705/37 |
| 2003/0167195 A1* | 9/2003 | Fernandes et al. | 705/8 |
| 2004/0015415 A1 | 1/2004 | Cofino et al. | |
| 2004/0019518 A1* | 1/2004 | Abraham et al. | 705/10 |
| 2004/0153358 A1* | 8/2004 | Lienhart | 705/10 |

FOREIGN PATENT DOCUMENTS

| | | |
|---|---|---|
| EP | 1087618 A2 | 3/2001 |
| GB | 2375624 | 11/2002 |
| WO | WO99/39273 | 8/1999 |
| WO | WO 00/51051 | 8/2000 |
| WO | WO 01/37137 | 5/2001 |

OTHER PUBLICATIONS

Fich, "Using prtocol analysis to evaluate the usability of a commercil web site", Computing and Decision Sciences Department, Stillman School of Business, Seton Hall University, 2001.*

(Continued)

*Primary Examiner* — Thomas Mansfield (57) ABSTRACT

A method is disclosed for evaluating the performance of a website. An agent interacts with the website using a behavior model of an exemplary website customer. The agent interacts with the website according to the behavior model and gathers website performance data related to the interaction. The performance data is compared to a utility function for the behavior model. A rating is assigned to the website based on the comparison, and the rating is made available to potential website customers seeking information related to the website's performance.

21 Claims, 4 Drawing Sheets

OTHER PUBLICATIONS

Terveen et al, "Does Authority Mean Quality?" Predicting Expert Quality Ratings of Web Documents, AT & T Shannon Laboratories, pp. 296-303, 2000.*

Selz et al, "A Model for the Evaluation and the Assessment of successful Electronic Commerce Applications", IEEE, 1060-3425, 1998.*

* cited by examiner

METHOD AND SYSTEM FOR EVALUATING PERFORMANCE OF A WEBSITE USING A CUSTOMER SEGMENT AGENT TO INTERACT WITH THE WEBSITE ACCORDING TO A BEHAVIOR MODEL

CROSS-REFERENCE TO RELATED APPLICATIONS

This application is related to U.S. patent application Ser. No. 10/378,814, entitled "METHOD AND SYSTEM FOR CUSTOMIZED CONFIGURATION OF AN APPEARANCE OF A WEBSITE FOR A USER" to Evan KIRSHENBAUM, et al.; U.S. patent application Ser. No. 10/378,857, entitled "SYSTEM, METHOD AND APPARATUS USING BIOMETRICS TO COMMUNICATE CUSTOMER DISSATISFACTION VIA STRESS LEVEL" to Carol McKENNAN, et al.; U.S. patent application Ser. No. 10/379,212, entitled "APPARATUS AND METHOD FOR THEOREM CERTIFICATION WITHOUT DISCLOSING DOCUMENTS THAT LEAD TO THE THEOREM" to Mathias SALLE; U.S. patent application Ser. No. 10/378,813, entitled "METHOD AND SYSTEM FOR SELLING AN ITEM OVER A COMPUTER NETWORK" to Evan KIRSHENBAUM, et al.; U.S. patent application Ser. No. 10/378,592, entitled "METHOD AND SYSTEM ENABLING THE TRADING OF A RIGHT TO PURCHASE GOODS OR SERVICES" to Robert C. VACANTE, et al.; U.S. patent application Ser. No. 10/378,823, entitled "METHOD AND SYSTEM FOR PROCESSING USER FEEDBACK RECEIVED FROM A USER OF A WEBSITE" to Mathias SALLE, et al., and U.S. patent application Ser. No. 10/378,835, entitled "A METHOD AND SYSTEM ENABLING THE TRADING OF A FUTURES CONTRACT FOR THE PURCHASE OF GOODS OR SERVICES" to Robert C. VACANTE, et al., all of which are concurrently herewith being filed under separate covers, the subject matters of which are herein incorporated by reference.

TECHNICAL FIELD

The technical field relates generally to networked computer systems. More particularly, the technical field relates to a software method of evaluating performance of a website using an agent to interact with the website according to a behavior model for a customer segment.

BACKGROUND

In the field of network computing, it is desirable for users, or customers, of websites to know how a website performs relative to similar websites, before the customer uses the website. For example, a customer wanting to purchase a particular good or category of goods via a network, such as the Internet, often has numerous choices of websites that sell the desired product. A buyer of a book can access various websites that sell books. Given the wide availability of similar websites, it is desirable for customers to have some means of distinguishing the websites when deciding which website to use. Some websites may be slower than others, less reliable than others, or more complicated to use than other websites. A customer may want to avoid these lesser quality websites and instead immediately access a better website. Likewise, it is desirable for operators of good websites to have a means of advertising that their websites are "better" than other, similar websites, as judged by an objective rating system.

Existing systems do not provide an efficient, effective way of rating websites based on performance. One existing method for evaluating websites is to receive feedback from customers of the website and to display this feedback on the website or on a related website that includes customer feedback for multiple websites. One problem with this method is that it requires input from actual customers, which takes time to gather and process, particularly to obtain a statistically meaningful sample. Another problem with this method is that the feedback is from self-selected customers. Only those customers who take the time to provide feedback are considered, and their opinions likely will tend to be more skewed one way or another. Also, customer feedback is always a subjective matter that relies on individual responses based on a limited experience with one website. One particular customer's experience with the website at one instance, for one transaction might not hold true for other customers. What is needed is a more reliable method of evaluating websites.

SUMMARY

A method is disclosed for evaluating the performance of a website. An agent accesses the website and interacts with the website in a manner that simulates an example session of interaction between a customer and the website. The agent interacts with the website according to the behavior model and gathers website performance data related to the interaction. The performance data is compared to a utility function for the behavior model. A rating is assigned to the website based on the comparison, and the rating is made available to potential website customers seeking information related to the website's performance. In one embodiment, different behavior models and utility functions are associated with different segments of website customers.

A tangible, computer-readable medium having computer-executable instructions is also disclosed for performing a method of evaluating performance of a website. A session is initiated between the website and a customer segment agent, and the customer segment agent interacts with the website according to a behavior model that is associated with a customer segment. Performance data is gathered for the website based on the interaction with the agent. The performance data is compared to a utility function for the customer segment, and a rating is assigned to the website based on the comparison.

A computer system is also disclosed for evaluating performance of a website. The system includes a data mining system that accesses customer data for customers of the website. The data mining system identifies customer segments and creates a behavior model and a utility function for each of the customer segments. The computer system also includes a customer segment agent that receives the behavior models and the utility functions from the data mining system. The customer segment agent interacts with the website according to the behavior models. While interacting with the website, the customer segment agent collects performance data for the website for each of the behavior models and compares the performance data to the utility functions to create a rating for the website for each of the customer segments.

DESCRIPTION OF THE DRAWINGS

The detailed description will refer to the following drawings, wherein like numerals refer to like elements, and wherein.

DETAILED DESCRIPTION

Figure 1:
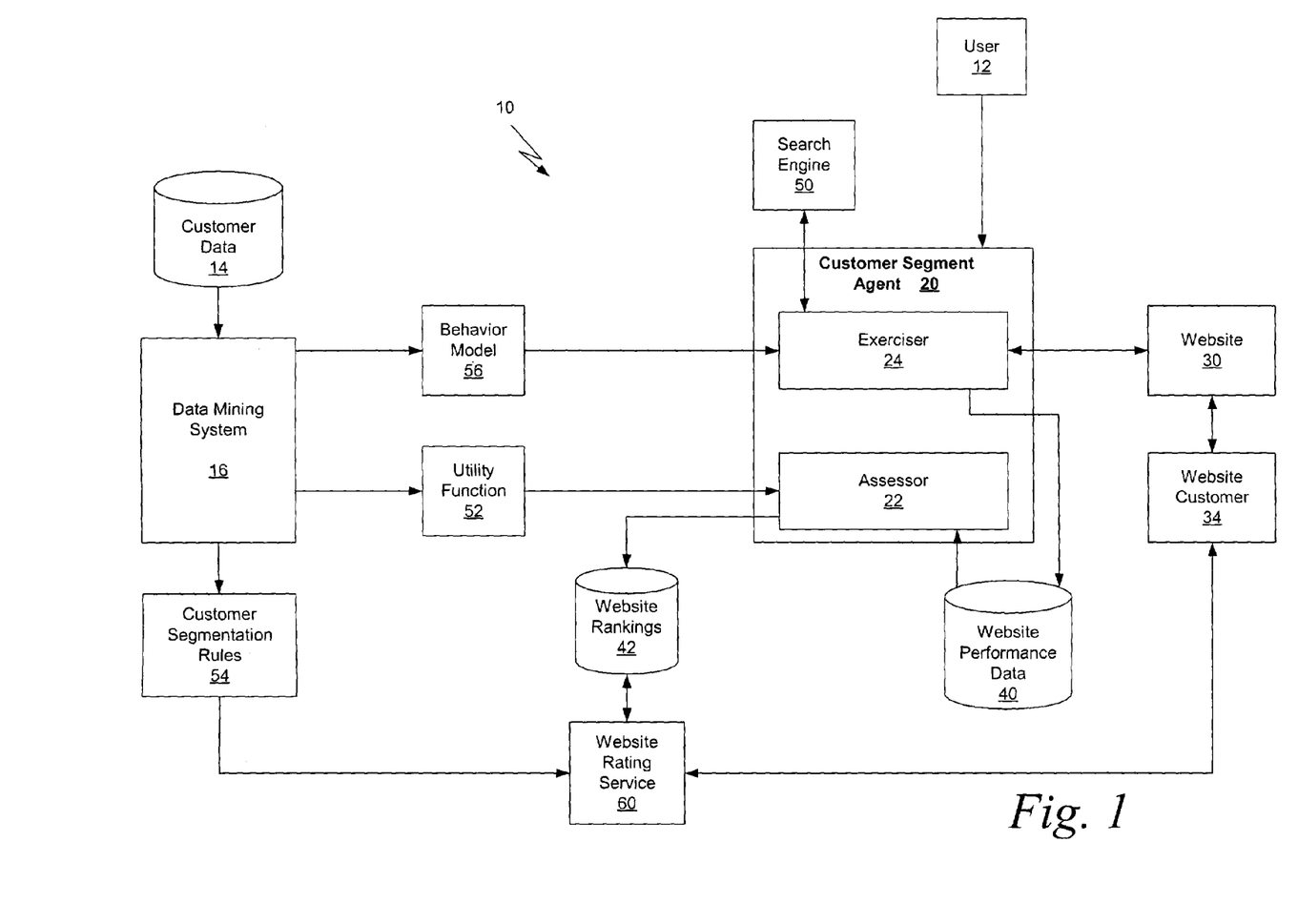
FIG. 1 shows a block diagram of a computer system for evaluating performance of a website.

FIG. 1 shows a block diagram of a computer system 10 for evaluating performance of a website 30. As used herein, the term "website" is used broadly and includes, for example, web services that interact between software programs, such as email filtering services, payment processing services, customer identity verification services, etc., and is not limited to systems providing access via any particular protocol, such as the HyperText Transfer Protocol (HTTP). An agent 20 is used to automatically test the website 30 by accessing the website 30 and interacting with the website 30 according to a behavior model 56.

In the example of FIG. 1, customer data has been collected for users of the website 30 (i.e., customers) and stored in a database 14. Customer data includes, for example, demographic data and data relating to website usage habits (e.g., usage log data) for users of the website 30. Data may be collected from various sources, using various means. For example, data may be collected automatically, based on customers' interactions with the website 30, or may be expressly requested from users via a customer survey. Customer data does not need to be collected from the same website 30 that the agent 20 interacts with, as described herein. Data may be collected from other sources, including other websites (not shown). Data may be collected using the website 30, or from other sources, such as entities with which the system 10 has a business relationship for the sale or use of customer data. A data mining system 16 accesses the database 14 and is used to analyze the customer data to create behavior models 56 for different segments of customers. The data mining system 16 identifies different types of customers based on their demographics, website usage patterns, and any other desired characteristics. For each type of customer, or "customer segment," the data mining system 16 creates a behavior model 56. The behavior model 56 is provided to the agent 20, which then initiates one or more sessions with the website 30 and interacts with the website according to the behavior model 56 to evaluate the website's performance.

The data mining system 16 also derives a utility function 52 for each customer segment. The utility function 52 is a benchmark for website performance for the behavior model 56. When the data mining system 16 creates the behavior model 56 to test the website 30, the data mining system 16 also creates the utility function 52 so that the customer segment agent 20 has a way of measuring the website's performance in response to requests following the behavior model 56. In one embodiment, the utility function 52 is a collection of website performance data that models an ideal performance of the behavior model 56. The agent 20 interacts with the website 30 according to the behavior model 56, collects website performance data, and compares the website performance data to the utility function 52 to create a rating for the website 30.

A behavior model 56 is a parameterization of a program that decides on a next action based on previous actions, used to simulate an example session between a website customer (e.g., 34) and the website 30. In one example, a behavior model 56 applies statistical models to particular customer transactions with the website. For example, with an electronic commerce website different behavior models are used for different segments of customers. In the case of a website (e.g., 30) that sells goods and services, various customer segments may be created, for example, for customers (e.g., 34) who are likely to carefully research products before purchasing, customers (e.g., 34) who are on a budget, customers (e.g., 34) who more often purchase based on impulse, customers (e.g., 34) who have more extensive knowledge of the products for sale, etc.

A data system 16 groups customers using customer data and segmentation rules 54. Segmentation rules 54 are sent to a website rating service 60 and are used by the rating service 60 to provide website rating information to the website customers (e.g., 34). The agent 20 applies various types of behavior models (e.g., 56) to the website 30 to determine how the website 30 performs for different segments of customers. In one embodiment, the utility function 52 is derived by determining customer preferences according to the method and system described in U.S. patent application Ser. No. 09/554,751, entitled "Modeling Decision-Maker Preferences Using Evolution Based on Sampled Preferences," filed on Apr. 7, 2000, by Evan Kirshenbaum, which is hereby incorporated by reference.

The data mining system 16 retrieves customer data from a database 14 and groups website customers into customer segments based on the customer data. The data mining system 16 creates customer segmentation rules 54 that are sent to a website rating service 60 and used to rate the website 30. The data mining system 16 also creates a behavior model 56 for each customer segment. The behavior model 56 is sent to the exerciser 24 of the customer segment agent 20. The exerciser 24 initiates as session with the website 30 and uses the behavior model 56 to interact with the website 30. The data mining system 16 also sends a utility function 52 to the agent 20. The utility function 52 is used by the assessor 24 of the agent 20 to evaluate the website 30.

The behavior model 56 causes the agent 20 to perform one or more typical transactions that might be performed by customers (e.g., 34) within a particular customer segment. By way of example, the system 10 may be implemented to evaluate a website 30 that sells books. A customer segment may be identified from the customer data as being those customers who purchase 3-5 books during a single session of interaction with the website 30. The behavior model 56 may be created to access the website 30 and perform all of the steps at the website 30 necessary to purchase four books. In one embodiment, the books are actually purchased and delivered to an address so that the functionality of the website 30 may be fully tested along with the related shipping and delivery functions.

In another embodiment, the behavior model 56 is a statistical model that performs different types of transactions. For example, the behavior model 56 might represent a customer segment that performs a particular type of transaction (e.g. purchase of a book) ten percent (10%) of the time, a different type of transaction (e.g., searching to multiple types of books) forty percent (40%) of the time, etc. In this example, the agent 20 interacts with the website 30 during multiple sessions at different times and performs the different transactions associated with the behavior model 56. For example, the agent 20 might perform the first type of transaction (e.g., purchase of a book) during 10% of the website sessions in the example above. The system 10 tests the website's performance of the behavior model 56. Performance data for the website 30 is gathered by the agent 20 and is stored in a database 40. By way of example, performance data includes data related to the complexity of the text displayed on the website 30, the formality of the language used by the website 30, the amount of animation, the number of items suggested, the use of "pop-up" menus or windows, etc.

In the example of FIG. 1, the agent 20 includes an exerciser 24 that interacts with the website 30 and an assessor 22 that processes website performance data resulting form the exerciser's interaction. The exerciser 24 receives the behavior model 56 from the data mining system 16 and interacts with the website 30 according to the behavior model 56. As a result of the interaction with the website 30, the exerciser 24 collects website performance data, such as website response time, product and service availability, ease of use, etc. The exerciser 24 stores the website performance data in a database 40. The assessor 22 retrieves the website performance data from the database 40. Using the utility function 52 received from the data mining system 16 and the performance data, the assessor 22 rates the website 30 and stores the rating in a website rankings database 42. A website rating service 60 receives the website rankings from the database 42 and applies the customer segment rules 54, received from the data mining system 16, to associate rankings with particular customer segments. The website rating service 60 provides the rankings to potential website customers, such as the customer 34 shown in FIG. 1.

A website rating service 60 provides a way for a customer (e.g., 34) to learn the rankings for various websites (e.g., 30) associated with the customer' segment. In response to a query from the customer 34, the rating service 60 uses the customer segmentation rules 54 and information provided by or known about the customer 34 to identify one or more customer segments that apply to the customer 34. Based on the query, the rating service 60 also identifies one or more websites (e.g., 30) and for each website (e.g., 30) retrieves from the rankings database 42 the ranking associated with that website (e.g., 30) and the customer segment(s) associated with the customer 34. The rating service 60en arranges for these rankings to be displayed to the customer 34.

In an alternative embodiment, in response to a query from a customer 34 for a website (e.g., 30) for which rankings are not available in the rankings database 42, the rating service 60 arranges for the customer segment agent 20 to access the website (e.g., 30), acting according to the behavior model 56 associated with the customer segment associated with the customer 34 and evaluating the results according to the utility function 52 associated with that customer segment. The rating service 60 then arranges for the rankings thus learned to be communicated to the customer 34.

Websites (e.g., 30) may be identified for testing in various ways. In the embodiment shown in FIG. 1, the customer segment agent 20 interfaces with a search engine 50, such as a conventional, publicly-available search engine accessible via the Internet. The search engine 50 is used to identify websites (e.g., 30) that fit within a desired category. In this use, the agent 20 interacts with the one or more identified websites (e.g., 30) according to the behavior model 56 and collects website performance data for each of the tested websites. For example, the system 10 may be implemented to test all websites (e.g., 30) that sell a particular good, such as books. The agent 10 identifies the websites (e.g., 30) to be tested by accessing the search engine 50 to obtain the names and locations of websites (e.g., 30) that sell the particular good. The agent 20 then interacts with the identified websites (e.g., 30) according to the behavior model 56, collects performance data for the identified websites (e.g., 30), and assigns ratings to the identified websites (e.g., 30) by comparing each website's performance data with the utility model 52. With ratings from multiple, similar websites (e.g., 30), a website customer (e.g., 34) can compare the relative performance of these websites (e.g., 30).

Also shown in FIG. 1, a user 12 may manually configure the agent 20. In this embodiment, a user 12 accesses the customer segment agent 20 to configure the agent 20 to configure or modify the behavior model 56. The user 12 shown in FIG. 1 is not a customer (e.g., 34) of the website 30, but instead is an operator of the system 10 who configures the customer segment agent 20, for example, by manually providing names of websites (e.g., 30) for testing, or by configuring or refining the customer segments. The user 12 may provide specific websites (e.g., 30) to test, rather than retrieving the websites (e.g., 30) automatically using the search engine 50. The user 12 may also provide input into the creation of customer segments by the data mining system 16. For example, the data mining system 16 may create multiple customer segments and create behavior models (e.g., 50) for each of the segments. The user 12 may further refine those customer segments, for example, to manually reorganize the customer segments into more desirable groups of customers (e.g., 34) or to create behavior models 56 for only some of the customer segments.

Figure 2:
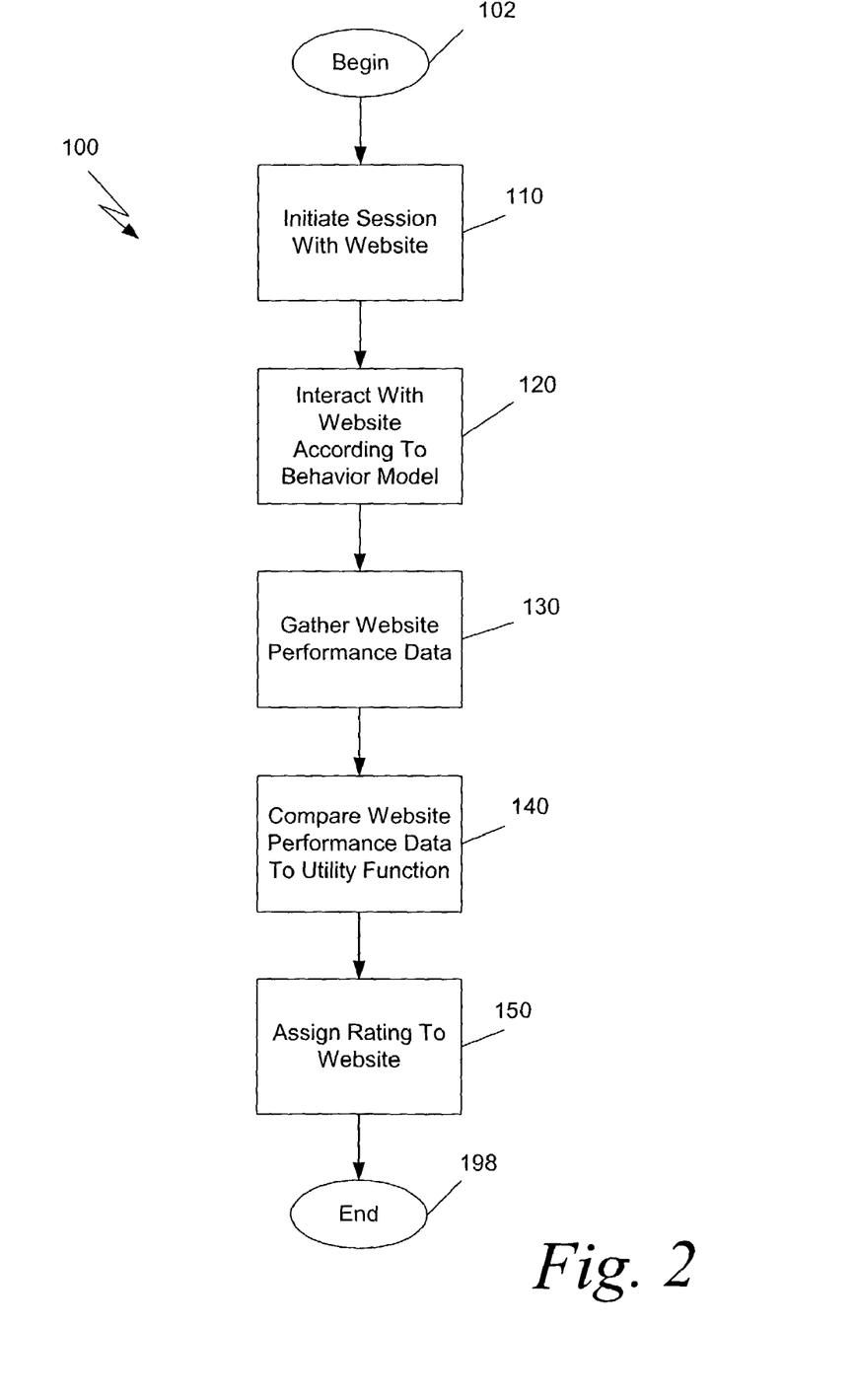
FIG. 2 is a flow chart of a method of evaluating performance of a website.

FIG. 2 is a flow chart of a method 100 of evaluating performance of a website 30. The method 100 begins 102 and initiates 110 a session with the website 30 using an agent 20. The agent 20 interacts 120 with the website 30 according to the behavior model 56. The agent 20 gathers 130 performance data from the website 30, based on the website's performance of the behavior model 56. The website's performance data is compared 140 to a utility function 52 to assign 150 a rating to the website 30, and the method 100 ends 198.

Figure 3:
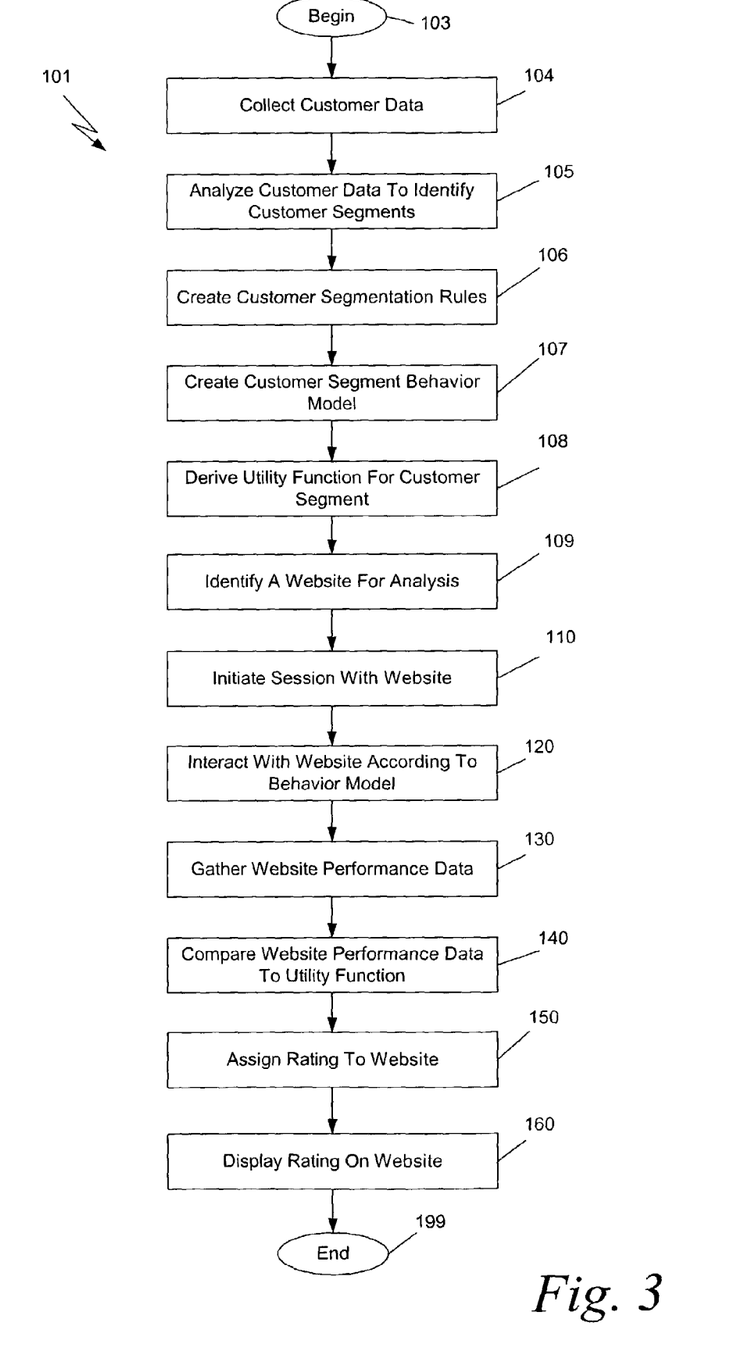
FIG. 3 is a more detailed flowchart of one embodiment of a method of evaluating performance of a website.

FIG. 3 is a more detailed flow chart of one embodiment of a method 101 of evaluating performance of a website 30. The method 101 begins 103 and collects customer data 104. Customer data may be retrieved in various methods. For example, the website 30 may expressly request demographic and other personal data for each customer (e.g., 34) who accesses the website 30. A more detailed survey may be given to customers (e.g., 34), requesting information regarding their website preferences, purchasing habits, personal interests, etc. Customer data may also be retrieved for individual customers (e.g., 34) without expressly requesting any information from the customers (e.g., 34). Log data may be obtained including customers' activity while accessing the website 30, such as how long the customer (e.g., 34) typically accesses the website 30, how many transactions the customer (e.g., 34) typically performs, how much money the customer (e.g., 34) spends in the case of an e-commerce website, the type and price of information or goods or services the customer (e.g., 34) typically accesses, what time of day the customer (e.g., 34) normally accesses the website 30, etc. Other customer data may be obtained based on the customer's connection to the website 30, such as the customer's connection speed, referring websites, header information, domain name, etc. Customer data may be stored to a database 14 and may be collected on an ongoing basis, adding data to the database 14 each time customers (e.g., 34) access the website 30. In one embodiment, the database 14 stores customer profiles with data specific to individual customers (e.g., 34), and new data is added to the customer profile whenever the customer (e.g., 34) accesses the website 30.

The data mining system 16 analyzes 105 customer data to identify groups of customers (e.g., 34), or "customer segments." The data mining system 16 creates 106 customer segmentation rules 54. The data mining system 16 also creates 107 a behavior model 56 for each customer segment and derives 108 a utility function 52 for each customer segment. A website (e.g., 30) is identified 109 for analysis. As explained with respect to FIG. 1, websites (e.g., 30) may be identified by the user 12 providing specific website addresses directly, or may be identified automatically, for example, by using a search engine 50 to identify several websites (e.g., 30) that meet search criteria. A website session is initiated 110 between the customer segment agent 20 and the website 30. The customer segment agent 20 interacts 120 with the website 30 according to the behavior model 56, gathering 130 data on the performance of the website 30. As shown in FIG. 1, the performance data may be stored in a database 40. The website performance data is compared 140 to the utility function 52. Based on the comparison, a rating is assigned 150 to the website 30.

The rating is displayed 160 on the website 30 so customers have access to the objective performance rating information. In one embodiment, the rating is provided by a website rating, service 60 that is independent of the website 30. In another embodiment, the rating service 60 provides the rating to the customer 34 on a separate website that includes ratings for multiple websites (e.g., 30). In one embodiment, the rating is used in connection with a search engine or similar application in which a customer (e.g., 34) searches for websites (e.g., 30) that are similar. For example, the customer (e.g., 34) may want to find websites (e.g., 30) that sell shoes. The search engine or similar application returns websites (e.g., 30) that meet the customer's search criteria and ranks the websites (e.g., 30) according to the rankings stored in the rankings database 42 based on websites' compliance with the utility function 52 for the customer segment.

In one embodiment, the rating information may be used as a certification process, whereby the rating indicates whether the website 30 meets the certification criteria. In one example, the utility function 52 specifies a minimum performance threshold, for instance, to indicate whether the website 30 passes or fails a test for certification, and the rating information indicates whether the website 30 meets the minimum performance threshold. In one embodiment, the rating is displayed on the website 30 using a portal that allows the rating information to be provided and updated by a source independent of the website.

In one embodiment, each website (e.g., 30) is assigned a separate rating for each customer segment. When a customer (e.g., 34) accesses the website 30, the customer (e.g., 34) is classified as one of the customer segments. A default customer segment may be applied to new customers or if there is otherwise insufficient customer data to classify the customer within a segment. The rating of the website 30 displayed for the customer 34 is the website's rating for the customer segment assigned to the customer 34. For example, four customer segments—A, B, C, D—may be assigned to a website 30. A behavior model 56 and utility function 52 are created 107, 108 for each customer segment. The agent 20 interacts with the website according to each behavior model 56, and a separate rating is assigned 150 to the website 30 for each of the customer segments A, B, C, D. Thereafter, when a customer 34 accesses the website 30, the customer 34 is associated with one of the customer segments, for example, segment B. The website's rating for customer segment B is displayed 160 for the customer because segment B is associated with the customer. If the customer 34 was classified as being in customer segment C, then the website's rating for customer segment C would be displayed 160. In one example, the rating is provided to the customer 34 by an independent rating service 60. The rating service 60 uses customer segmentation rules 54 received from the data mining system 16 to associate the customer 34 with one of the customer segments. The rating service 60 then provides to the customer 34 the rating for the website so that it is associated with the customer's segment.

Figure 4:
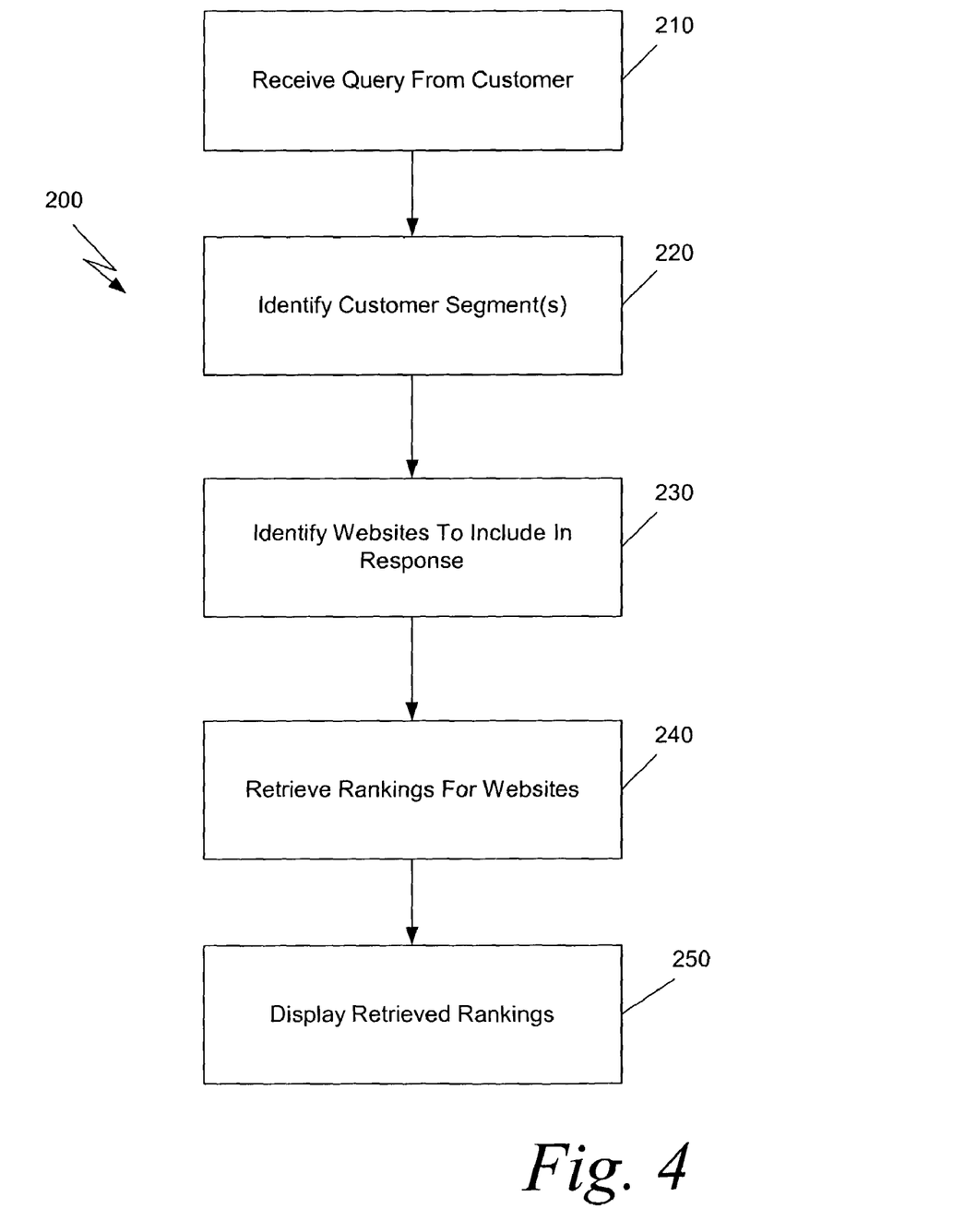
FIG. 4 shows a flowchart of one embodiment of a method by which a customer interacts with the website rating service.

FIG. 4 shows a flowchart of one embodiment of a method 200 by which a customer 34 interacts with the website rating service 60. The rating service 60 receives 210 a query from the customer 34. Based on information provided in the query or other information about the customer 34 available to the rating service 60, the rating service uses customer segmentation rules 54 to identify 220 one or more customer segments with which the customer 34 should be associated. Also based on information provided in the query, the rating service 60 identifies 230 a set of websites (e.g., 30) to include in response. For each website (e.g., 30), the ranting service 60 retrieves 240 from the website rankings database 42 the rankings associated with that website (e.g., 30) and each of the identified customer segments. The rating service 60 then formats and displays 250 the retrieved rankings to the customer 34.

In an alternative embodiment, the rating service 60 receives a query from a customer (e.g., 34), identifies one or more customer segments, and identifies a set of websites relevant to the query. In this embodiment, if the website rankings database 42 does not contain a ranking for one or more of the identified websites (e.g., 30) as pertains to one or more of the identified customer segments, then the rating service 60 causes the customer segment agent 20 to interact with the websites (e.g., 30) to retrieve performance data and to create rankings for the websites (e.g., 30). After the customer segment agent 20 has obtained rankings for the missing websites, the rating service 60, retrieves the rankings from the rankings database 42 (or receives them directly from the agent 20) and provides them to the customer 34.

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

The invention claimed is:

1. A method for evaluating performance of a website, comprising:
   interacting with the website using an agent according to a behavior model associated with a customer segment, wherein the behavior model includes parameters that instruct the agent to automatically interact with the website in a manner that models a behavior of a customer;
   gathering website performance data related to the interacting;
   comparing the website performance data to a utility function associated with the behavior model; and
   assigning a rating to the website based on the comparing.

2. The method of claim 1, further comprising displaying the rating on the website.

3. The method of claim 1, further comprising storing the performance data in a database separate from the website.

4. The method of claim 1, further comprising:
   analyzing customer data to identify a plurality of customer segments;
   creating behavior models for each of the customer segments; and
   deriving utility functions for each of the behavior models, and wherein the step of interacting comprises interacting according to at least one of the behavior models.

5. The method of claim 4 further comprising:
   creating customer segmentation rules for each of the customer segments; and
   providing the rating to a customer based on the customer segmentation rules.

6. The method of claim 5, further comprising:
   associating the customer website with one of the customer segments; and
   providing to the customer the performance rating of the website, wherein the performance rating is associated with the customer segment with which the customer is associated.

7. The method of claim 1, wherein the step of interacting comprises interacting according to each of a plurality of behavior models associated with different customer segments, wherein the step of gathering comprises gathering performance data for the website for each of the customer segments, wherein the assigning comprises assigning the website a separate rating for each of the customer segments.

8. The method of claim 1, further comprising identifying a plurality of websites for analysis, and wherein the step of interacting comprises interacting according to the behavior model with each of the identified websites, and wherein the step of gathering data comprises gathering data for each of the identified websites, and wherein the step of rating comprises rating each of the identified websites.

9. The method of claim 8, wherein the step of identifying comprises retrieving a plurality of websites from a search engine.

10. A tangible, computer-readable medium having stored thereon computer-executable instructions for performing a method of evaluating performance of a website using a customer segment agent, wherein the method comprises:
    initiating a session between the customer segment agent and the website;
    interacting with the website according to a behavior model associated with a customer segment, wherein the behavior model includes parameters that instruct the agent to automatically interact with the website in a manner that models a behavior of a customer;
    gathering performance data for the website, based on the interacting;
    comparing the performance data to a utility function associated with the customer segment; and
    assigning a rating to the website based on the comparing.

11. The medium of claim 10, wherein the step of initiating comprises initiating sessions with a plurality of websites, wherein the step of interacting comprises interacting with each of the websites according to a plurality of behavior models, each of the behavior models being associated with a different customer segment, wherein the step of gathering comprises gather performance data for each of the behavior models and for each of the websites, and wherein the step of comparing comprises comparing the performance data for each of the behavior models to utility functions associated with the different customer segments.

12. The medium of claim 11, wherein the step of assigning comprises:
    receiving a query from a customer; identifying a customer segment associated with the customer; and retrieving rankings for a plurality of websites, the rankings being associated with the customer's customer segment.

13. The medium of claim 12, wherein the method further comprises:
    collecting customer data; analyzing the customer data to identify customer segments; and
    creating customer segmentation rules; and
    wherein the step of identifying a customer segment associated with the customer comprises using the customer segmentation rules to identify the customer segment associated with the customer.

14. The medium of claim 10, wherein the step of gathering performance data comprises gathering data related to the complexity of text displayed by the website.

15. The medium of claim 10, wherein the step of interacting comprises interacting with the website in a plurality of sessions, wherein the behavior model is a statistical model that performs different types of transactions to model interaction between the website and a customer in the customer segment associated with the behavior model.

16. A computer system for evaluating performance of a website, comprising:
    a data mining system that accesses customer data for customers of the website, wherein the data mining system identifies customer segments and creates a behavior model and a utility function for each of the customer segments; and
    a customer segment agent that receives the behavior models and the utility functions from the data mining system, wherein the customer segment agent interacts with the website according to the behavior models, collects performance data for the website for each of the behavior models, and compares the performance data to the utility functions to create a rating for the website for each of the customer segments, wherein the behavior model includes parameters that instruct the agent to automatically interact with the website in a manner that models a behavior of a customer.

17. The system of claim 16, wherein the customer segment agent stores the website ratings in a database that is accessed by a rating service that provides ratings of a plurality of websites to customers.

18. The system of claim 17, wherein the data mining system creates customer segmentation rules and provides the customer segmentation rules to the rating service, wherein the customer segmentation rules may be used by the rating service to associate the customers with customer segments.

19. The system of claim 16, wherein the customer segment agent interacts with a plurality of similar websites, and wherein the customer segment agent accesses a search engine to identify the plurality of similar websites.

20. The system of claim 16, further comprising a website rating service that receives a request from a customer, associates the customer with a customer segment, and provides to the customer ratings associated with the customer segment associated with the customer.

21. The system of claim 20, wherein the customer service agent interacts with the website following a request received by the rating service from a customer.

* * * * *

UNITED STATES PATENT AND TRADEMARK OFFICE
CERTIFICATE OF CORRECTION

| | | |
|---|---|---|
| PATENT NO. | : 8,069,075 B2 | Page 1 of 1 |
| APPLICATION NO. | : 10/378872 | |
| DATED | : November 29, 2011 | |
| INVENTOR(S) | : Cipriano Santos et al. | |

It is certified that error appears in the above-identified patent and that said Letters Patent is hereby corrected as shown below:

In column 9, line 60, in Claim 11, delete "gather" and insert -- gathering --, therefor.

Signed and Sealed this
Fifteenth Day of January, 2013

David J. Kappos
*Director of the United States Patent and Trademark Office*